(Model.)
F. BLOCKI.
FEED CUTTER.
No. 316,000. Patented Apr. 21, 1885.
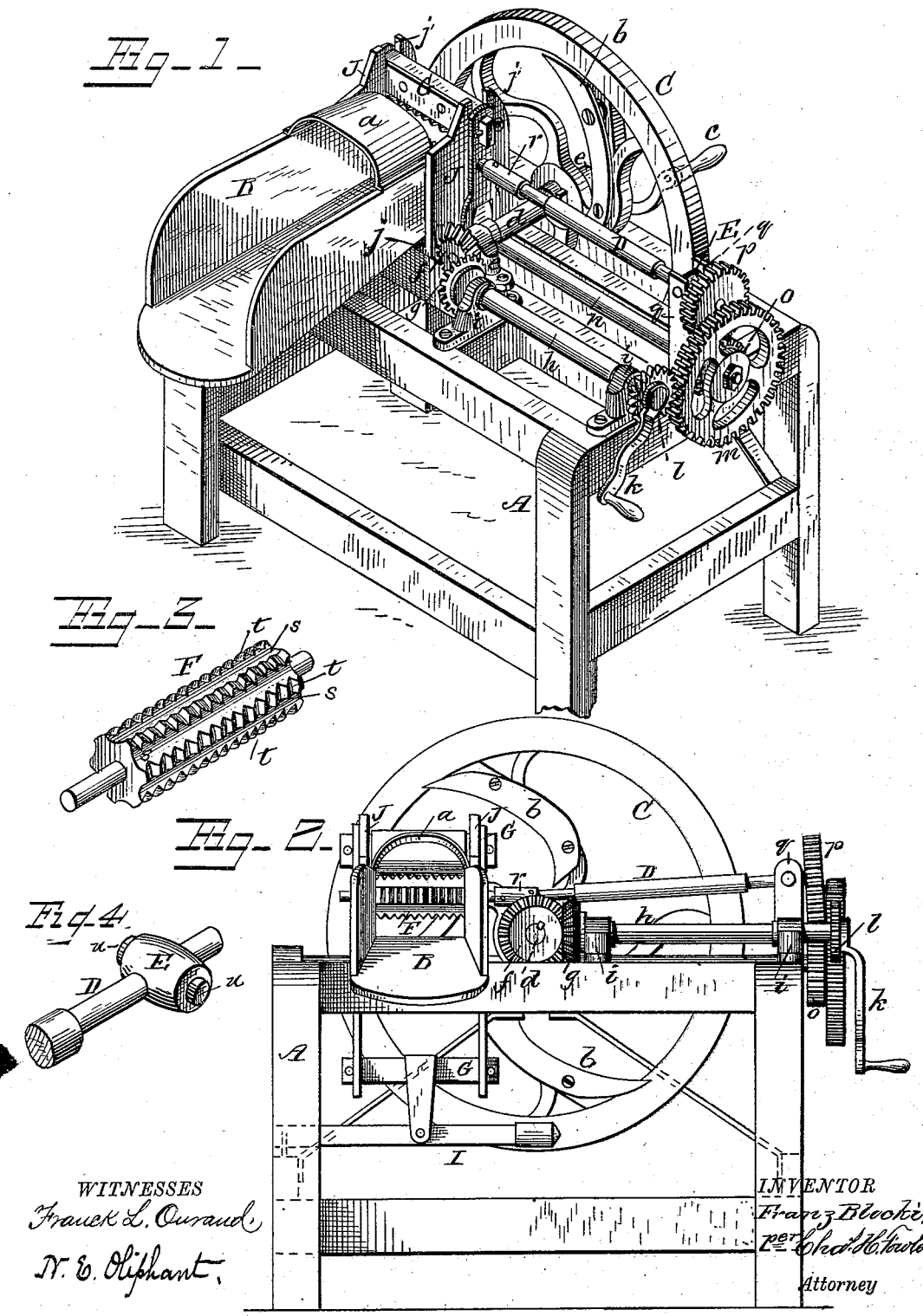
WITNESSES
Franck L. Ouraud,
N. E. Oliphant.
INVENTOR
Franz Blocki,
per Chas. H. Fowler
Attorney United States Patent Office.

FRANZ BLOCKI, OF SHEBOYGAN, WISCONSIN.

FEED-CUTTER.

SPECIFICATION forming part of Letters Patent No. 316,000, dated April 21, 1885.

Application filed November 25, 1882. (Model.)

*To all whom it may concern:*

Be it known that I, FRANZ BLOCKI, a citizen of the United States, residing at Sheboygan, in the county of Sheboygan and State of Wisconsin, have invented certain new and useful Improvements in Feed-Cutters; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a front elevation thereof; Fig. 3, a detail view in perspective of one of the feeding-rollers, and Fig. 4 a detail view of the swivel-bearing for the shaft.

The present invention has relation to certain new and useful improvements in feed-cutters; and the object thereof is to provide such a machine as will perfectly and effectually cut to the required fineness the hay or other feed with comparatively little power being exerted, and the feed-rollers accommodating themselves to the varying quantity of feed introduced between them; also, to greatly simplify the operating mechanism and render the machine less liable to get out of order, thus insuring its durability and increased effectiveness for the purpose intended. These several objects I attain by the construction substantially as shown in the drawings, and hereinafter described and claimed.

In the accompanying drawings, A represents the frame of the machine, of any suitable form and construction, and provided with the usual cutting-box, B, with hood $a$.

A fly-wheel, C, has detachably connected to it a series of curved knives, $b$, and a crank-handle, $c$, for operating said wheel, the knives being of such length and connected to the wheel in such manner that the outer end of the knives will begin to cut first, thus making a draw or shear cut across the feed, and also cutting in a downward direction, and also in the direction with the motion of the fly-wheel. The fly-wheel C is keyed to a shaft, $d$, and is provided with a handle, $c$, said shaft being arranged transversely of the frame A, and having its bearings in suitable boxes, $e$, connected thereto.

To the end of the shaft $d$ is rigidly affixed a pinion, $f$, which meshes with a pinion, $g$, upon the end of a shaft, $h$, said shaft running lengthwise of the frame A, and has its bearings in boxes $i$. The shaft $h$ has keyed to its outer end a crank-handle, $k$, for operating it, and also a pinion, $l$, which gears with a large toothed wheel, $m$, rigidly secured to the outer end of a shaft, $n$, also running lengthwise of the frame A. This shaft has secured to it a pinion, $o$, which meshes with the teeth of a pinion, $p$, upon the end of a shaft, D, the outer end thereof having its bearing in a swivel-box, E, connected to standards $q$, extending up from the frame A.

The shaft D, at its inner or opposite end, is connected to a universal coupling, $r$, which in turn is connected to the axle of the upper feed-roller, F, the axle of said feed-roller having its bearings in a vertically-sliding hanger, G, while the lower feed-roller is connected directly to the shaft $n$.

The hanger G, which extends down some distance below the frame, has pivoted to it a weighted lever, I, the outer end thereof being pivoted or otherwise suitably connected to the frame A.

The weight upon the end of the pivoted lever may, if desired, be made adjustable thereon to regulate the action of the upper feed-roller, F, the object of the movable hanger G, with its pivoted and weighted lever, being to allow the space between the feed-rollers to accommodate itself to the varying quantity of feed passing between them, the weighted lever keeping the hanger pressed down sufficiently to insure the upper feed-roller acting on the feed at all times to deliver it to the knives.

The hanger G works in slotted panels J, secured to the frame A, and between which the end of the cutting-box B extends, said panels forming guides for the hanger in its vertical movement when the upper feed-roller is automatically raised or lowered.

The advantages of the swivel-box E and universal coupling $r$, by means of which the two ends of the shaft D are supported, enable the shaft to act in harmony with the vertical movement of the hanger G, assuming an angle to a horizontal, as shown in Fig. 2, without affecting the gearing between the wheels $o$ $p$, the swivel-box E having journals $u$, by which it is connected to the standards $q$, thus admitting of its rocking upon its journals, the end of the shaft D sliding in the box, for the purpose hereinbefore stated.

The panels J are joined at their lower ends by a cross-plate, *j*, the whole being cast together with a vertical slot, *j'*, in each panel.

The feed-rollers F have grooves *s* running lengthwise or parallel with the axis thereof, and a series of teeth, *t*, also running lengthwise and upon each side of the grooves, thus producing a feed-roller that will act with more positive effect upon the feed, the teeth and grooves acting in conjunction with each other in carrying and delivering the feed to the cutting-knives.

Having now fully described my invention, what I claim as new, and desire to secure by Letters Patent, is—

The herein shown and described feed-cutter, consisting of the frame A, box B, vertically-slotted panel-plate J, cast in one piece with the cross-bar *j*, embracing the sides of the box B at the end, and forming fixed bearings for one of the feed-rolls, vertically-moving hanger G, carrying the other feed-roll, shaft D, loosely connected at one end to the feed-roll F, its other end working through the swiveled bearing E, transverse shaft *d*, fly-wheel C, carrying concave-shaped cutters *b*, keyed to the end of said shaft, longitudinal shaft *h*, intermeshing pinions *f* and *g*, shaft *n*, and the train of gearing *p*, *o*, *m*, and *l*, all combined, arranged, and operating substantially as shown and described.

In testimony that I claim the above I have hereunto subscribed my name in the presence of two witnesses.

FRANZ BLOCKI.

Witnesses:
VAL DETLING,
JOHN HAFENBAUER.